United States Patent
Godeau et al.

(10) Patent No.: US 11,656,481 B2
(45) Date of Patent: May 23, 2023

(54) EYEWEAR FRAME, AN EYEWEAR, AND A METHOD OF ADJUSTING AN EYEWEAR FRAME

(71) Applicant: Essilor International, Charenton-le-Pont (FR)

(72) Inventors: Muriel Godeau, Charenton-le-Pont (FR); Mathieu Feuillade, Charenton-le-Pont (FR); Pauline Colas, Charenton-le-Pont (FR); Anna Yeo, Singapore (SG); Yee Ling Wong, Singapore (SG)

(73) Assignee: Essilor International, Charenton-le-Pont (FR)

( * ) Notice: Subject to any disclaimer, the term of this patent is extended or adjusted under 35 U.S.C. 154(b) by 340 days.

(21) Appl. No.: 16/970,570

(22) PCT Filed: Feb. 19, 2019

(86) PCT No.: PCT/EP2019/054039
§ 371 (c)(1),
(2) Date: Aug. 17, 2020

(87) PCT Pub. No.: WO2019/162248
PCT Pub. Date: Aug. 29, 2019

(65) Prior Publication Data
US 2021/0109371 A1    Apr. 15, 2021

(30) Foreign Application Priority Data
Feb. 21, 2018  (EP) .................................... 18305184

(51) Int. Cl.
*G02C 5/00*  (2006.01)
*G02C 5/20*  (2006.01)
(Continued)

(52) U.S. Cl.
CPC ............. *G02C 5/008* (2013.01); *G02C 5/001* (2013.01); *G02C 5/20* (2013.01); *G02C 5/04* (2013.01);
(Continued)

(58) Field of Classification Search
CPC .......... G02C 5/008; G02C 5/001; G02C 5/20; G02C 5/04; G02C 5/122; G02C 2200/02
See application file for complete search history.

(56) References Cited

U.S. PATENT DOCUMENTS

| 7,575,807 B1 | 8/2009 | Barvosa-Carter et al. |
| 2003/0020866 A1* | 1/2003 | Asano ............... G02C 5/18 351/122 |

(Continued)

FOREIGN PATENT DOCUMENTS

| CN | 103852904 | 6/2014 |
| EP | 1 062 278 | 12/2000 |

(Continued)

OTHER PUBLICATIONS

International Search Report for PCT/EP2019/054039 dated Apr. 18, 2019, 4 pages.
(Continued)

*Primary Examiner* — Cara E Rakowski
(74) *Attorney, Agent, or Firm* — Nixon & Vanderhye (57) ABSTRACT

An eyewear frame having at least one frame component including a stimuli-responsive polymer is provided. The at least one frame component has a physical property which is reversibly changeable in response to a stimulus of non-thermal origin applied to the stimuli-responsive polymer. An eyewear including the eyewear frame, and a method of adjusting the eyewear frame are also provided.

19 Claims, 6 Drawing Sheets

(51) Int. Cl.
　　　*G02C 5/04*　　　　(2006.01)
　　　*G02C 5/12*　　　　(2006.01)
(52) U.S. Cl.
　　　CPC ......... *G02C 5/122* (2013.01); *G02C 2200/02* (2013.01)

(56) References Cited

U.S. PATENT DOCUMENTS

| | | | |
|---|---|---|---|
| 2003/0055198 A1* | 3/2003 | Langer | C08L 101/00 528/80 |
| 2014/0152953 A1 | 6/2014 | Guillon et al. | |
| 2015/0332566 A1 | 11/2015 | Visitacion et al. | |
| 2020/0251868 A1* | 8/2020 | Nicholsen | H01R 43/16 |

FOREIGN PATENT DOCUMENTS

| | | |
|---|---|---|
| EP | 3045952 A1 * | 7/2016 |
| JP | 2003-043426 | 2/2003 |
| WO | 99/42528 | 8/1999 |

OTHER PUBLICATIONS

Written Opinion of the ISA for PCT/EP2019/054039 dated Apr. 18, 2019, 7 pages.

* cited by examiner

EYEWEAR FRAME, AN EYEWEAR, AND A METHOD OF ADJUSTING AN EYEWEAR FRAME

This application is the U.S. national phase of International Application No. PCT/EP2019/054039 filed Feb. 19, 2019 which designated the U.S. and claims priority to EP Patent Application No. 18305184.6 filed Feb. 21, 2018, the entire contents of each of which are hereby incorporated by reference.

TECHNICAL FIELD OF THE INVENTION

This disclosure relates generally to eyewear frames, eyewears, and methods of adjusting eyewear frames.

BACKGROUND INFORMATION AND PRIOR ART

A substantial percentage of the world's population wears prescription eyeglasses to correct their eyesight. Protective eyewear, such as sunglasses and safety glasses, are also worn by individuals to protect his/her eyes from harmful ultraviolet rays from the sun, and/or noxious particles and contaminants.

Generally, individuals may buy eyeglasses from an optical shop, and an eyecare practitioner (ECP) may attempt to adjust some parts of the frame, such as a curvature of the frame temple to fit the morphology of the wearer's head. Most parts of the frame are, however, in fixed positions, and can therefore not be easily readjusted by the wearer. Moreover, the eyeglasses cannot be adapted to activities, such as sports and for industrial use, where such eyewear is usually designed to fit relatively close to a wearer's face to protect his/her eyes.

In addition, the eyewear may be provided in only a few sizes and/or configurations, and do not fit every wearer's face. This may result in poor-fitting eyewear, which may render it more difficult for a wearer to see, or which may not adequately cover and/or protect a wearer's eyes. In some instances, injury to the wearer's face may result due to the poor fit, and/or inadequate protection conferred by the poor-fitting eyewear.

The sliding down of eyeglasses along the nose is also a common phenomenon for eyeglass users, particularly during activities with high intensities due to sweat and sebum production on the nose, which further aggravates the above-mentioned problems.

Even though components intended to increase the grip of the frames to the face of wearers may be used, these additional components often add to the weight of the eyeglasses and paradoxically weigh the eyeglasses down.

In view of the above, there remains a need for an improved eyewear frame and eyewear that overcomes or at least alleviates one or more of the above-mentioned problems.

SUMMARY OF THE INVENTION

In a first aspect, an eyewear frame having at least one frame component comprising a stimuli-responsive polymer is provided. The frame component has a physical property which is reversibly changeable in response to a stimulus of non-thermal origin applied to the stimuli-responsive polymer. Further advantageous and non-limiting features of the eyewear frame in accordance with the invention are specified in claims 2 to 13.

In a second aspect, an eyewear comprising an eyewear frame according to the first aspect and an optical lens is provided.

In a third aspect, a method of adjusting an eyewear frame is provided. The method comprises:

a) providing an eyewear frame according to the first aspect, b) disposing the frame component comprising the stimuli-responsive polymer in a mould having a predefined physical property, and c) applying a stimulus of non-thermal origin to the stimuli-responsive polymer until the physical property of the frame component is adapted to the predefined physical property of the mould.

DETAILED DESCRIPTION OF EXAMPLE(S)

The invention will be better understood with reference to the detailed description when considered in conjunction with the non-limiting examples and the accompanying drawings, in which.

By having a physical property of the eyewear frame that may be reversibly changed with ease either by the eyecare practitioner or wearer, or automatically with help of an external stimulus, adjustment of the eyewear frame may be carried out during a certain activity, thereby providing ease of use as compared to existing frames. As each change made to the frame is reversible, this may bring about wider degrees of mobility to the frame (or a part of it), as there may be multiple predefined positions where the frame may be put into, or a variation of texture on portions of the frame.

With the above in mind, various embodiments refer in a first aspect to an eyewear frame having at least one frame component comprising a stimuli-responsive polymer, wherein the frame component has a physical property which is reversibly changeable in response to a stimulus of non-thermal origin applied to the stimuli-responsive polymer.

As used herein, the term "eyewear" refers generally to items and accessories worn on or over the eyes, which may be for purposes of improving or enhancing visual acuity, for protecting against the environment, for fashion, or for adornment. Examples of eyewear may include eyeglasses, goggles, or other objects on or worn over the eyes, or head-mounted devices. Eyeglasses, also termed herein as glasses or spectacles, may include sunglasses, prescription glasses, prescription sunglasses, transitional glasses, reading glasses, safety glasses, novelty glasses, costume glasses, 3D glasses, fashion glasses, and the like. Accordingly, the eyewear may include one or more of prescription, non-prescription, reflective, anti-reflective, magnifying, polarizing, colored, tinted, clear, anti-fogging, ultraviolet (UV) light protected, or other lenses.

The eyewear frame disclosed herein may have at least one frame component comprising a stimuli-responsive polymer. The stimuli responsive polymer may confer the frame component with ability to change reversibly one of its physical properties under the action of a stimulus.

The frame component may be selected from the group consisting of a frame temple, an ear piece, a nose pad, a pad arm, a bridge, a top bar, a rim, an eye-wire, an end piece, a front part, a hinge, a screw, a polymeric film comprising the stimuli-responsive polymer, a portion thereof, and a combination thereof.

Figure 1:
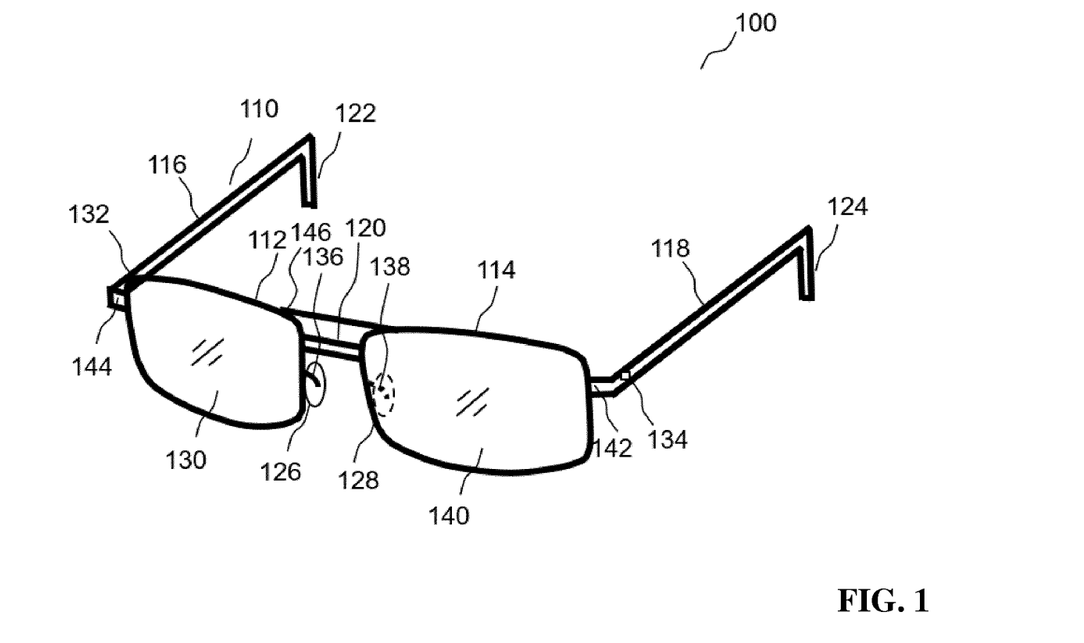
FIG. 1 is a schematic diagram of an eyewear according to various embodiments.

For illustration purposes, FIG. 1 depicts an eyewear 100 according to embodiments, in which various frame components are shown.

Referring to FIG. 1, the eyewear 100 may include a frame 110. The eyewear 100 may further include a first lens 130 and a second lens 140 coupled to the frame 110. The first lens 130 and the second lens 140 may independently be single vision lenses or myopia control lenses, such as progressive addition lenses (PALs), bifocals, trifocals, prismatic addition bifocals, peripheral correction lenses, etc.

The frame 110 may be a structure receiving, retaining, holding, and/or supporting the first lens 130 and the second lens 140 such that the first lens 130 and the second lens 140 may be aligned or lined up abreast with respect to each other so as to be placed in front of respective eyes of a wearer when the eyewear 100 is being worn.

The frame 110 may include a rim (or eye-wire) 112, 114 for receiving, retaining, holding, and/or supporting each of the first and second lens 130, 140. As shown, the frame 110 may include two rims 112, 114 in a side-by-side or alongside or abreast arrangement. Each of the two rims 112, 114 may be a full rim. According to various embodiments, the rim 112, 114 may also be a half rim, or the frame 110 may be without any rims. Accordingly, the frame 110 may be a full rimmed frame or a semi-rimless frame or a rimless frame.

The frame 110 may also include a bridge 120. The bridge 120 may be a part of the frame 110 which may be connected to the first lens 130 and the second lens 140. Accordingly, the bridge 120 may be between the first lens 130 and the second lens 140. Further, the bridge 120 may be above the nose of the wearer when the eyewear 100 is being worn. A top bar 146 may be included in the frame 110.

The frame 110 may also include a pair of nose pads 126, 128. The pair of nose pads 126, 128 may be connected to the frame 110 by a respective pad arm 136, 138. The pair of nose pads 126, 128 may be attached to the respective pad arm 136, 138 using an adhesive or by a screw (not shown). Respective portions of each of the pair of nose pads 126, 128 may be rested on or placed on the nose of the wearer when the eyewear 100 is being worn. Together, the rims 112, 114, the nose pads 126, 128, the pad arms 136, 138, the bridge 120, and the top bar 146 may constitute a front part of the frame, which functions to hold the lenses in place and bridge the top of the nose.

The frame 110 may also include a pair of frame temples 116, 118. The pair of frame temples 116, 118 may constitute a pair of elongated side pieces of the frame 110. Respective portions of each of the pair of frame temples 116, 118 may be rested or placed on the ear of the wearer when the eyewear 100 is being worn. The pair of frame temples 116, 118 may comprise a pair of earpieces 122, 124, wherein the term "earpiece", otherwise termed as "end tip" or "tip portion of temple", refers to a portion or endwise portion of the frame temples that supports or helps support the eyewear by engaging upon an ear of the wearer.

According to various embodiments, the pair of frame temples 116, 118 may be hinged frame temples or hinge-less frame temples. The term "hinge" as used herein refers to a jointed or flexible component that connects and permits pivoting or turning of a part to a stationary component. Each hinge is usually formed by two pivot elements, pivoted to each other, of which, respectively, a first element is fixed to a temple and a second element is fixed to a lateral portion of the front of the frame (also known as "end piece"). A pair of hinges 132, 134 are shown in FIG. 1, and connects the pair of frame temples 116, 118 to the rim 112, 114 at endpieces 142, 144, which may be positioned between the rims 112, 114 and the frame temples 116, 118. In operation, the hinges allow the temples to rotate between a closed position, in which they are collected on the front of the eyeglasses, and an open position, in which they assume a substantially right-angle position with respect to the front adapted to allow the use thereof on the face of the user.

The pair of frame temples 116, 118 may be attached to the respective hinge 132, 134 using an adhesive or a screw (not shown). In some embodiments, the rim 112, 114 and the pair of frame temples 116, 118 are integrally formed and a hinge is not present. In embodiments wherein the frame is a rimless frame, the pair of hinges 132, 134 may connect the pair of frame temples 116, 118 directly to the lens 130, 140.

The frame component may, in some embodiments, be an integral part of the eyewear frame. This means that the frame component is formed integrally as a single piece with the eyewear frame, and is not designed to be removable from the eyewear frame. The frame component may, in some embodiments, be removably attached to the eyewear frame. By the term "removably attached", it means that the frame component may be a part that can be temporarily attached to the eyewear frame, and which may be removed using a simple tool in some embodiments, or which does not require use of a tool to attach or remove in others. For example, an ear piece may be an attachment, and have a hollow center for slotting into a frame temple as a temporary attachment in order to customize the grip on a wearer's head, and which may be removed by slotting the ear piece from the frame temple. In some embodiments, the ear piece may be in the form of a strap removably attached to both frame temples, such that upon application of a suitable stimulus such as a light stimulus, the strap may undergo a reduction in length and/or a change in shape so as to increase grip of the eyewear on a wearer's head. Other examples may include, but are not limited to, a nose pad or a screw, which may be removably attached to the eyewear frame using a screwdriver.

At least one frame component may comprise a stimuli-responsive polymer. As used herein, the term "stimuli-responsive polymer" refers to a polymer, which may be synthetic, naturally occurring or semi-synthetic, and which is able to exhibit rapid and reversible changes in conformation as a response to an external stimulus to give rise to a change in physical property. The conformational change may generally be attached to a chemical modification which may be reversible, such as pairing by hydrogen bonding, ionic or dipole solvation or desolvation. Expansion, contraction, application of pressure, and change of shape and/or texture are non-limiting examples of responses to the stimulus of non-thermal origin.

The external stimulus may be of non-thermal origin, meaning that the stimulus is not one of direct heating. For example, the stimulus of non-thermal origin does not include heating and/or subjecting the stimuli-responsive polymer to a heating source. Accordingly, even though applying an electrical stimulus or electromagnetic wave stimulus or light stimulus to a stimuli-responsive polymer may result in increase in temperature of the stimuli-responsive polymer, and in turn the frame component comprising the stimuli-responsive polymer, these stimuli are of non-thermal origin, and are therefore distinguished from a stimulus of thermal origin where direct heating is used.

In various embodiments, the stimulus is selected from the group consisting of a mechanical stimulus, an electrical stimulus, a chemical stimulus, a hygrometry stimulus, an electromagnetic wave stimulus, a light stimulus, a biological stimulus, a magnetic stimulus, an acoustic stimulus, and a combination thereof.

The term "mechanical stimulus" as used herein may refer to touching or applying a force or pressure on the stimuli-responsive polymer. The stimuli-responsive polymer which responds to a mechanical stimulus may be a mechanically expandable or compressible material, such as a shape memory polymer, a piezoelectric polymer, an elastomer such as silicone, or a polymer with reversible Van der Waals interactions. Properties of the mechanical stimulus that may be varied include, but are not limited to, amount of force applied, area and/or direction of force application, and duration of force application. One or more mechanical properties may be varied to modulate the mechanical stimulus on the stimuli responsive polymer.

Examples of stimuli-responsive polymer which responds to a mechanical stimulus may be a shape memory polymer such as polyurethanes, polynorbomenes, polyacrylates, polymethyl methacrylates, polyethers, polyamides, polysiloxanes, polyether amides, polyether esters, and trans-polyisoprenes. The stimuli-responsive polymer may be a chemically cross-linked shape memory polymer such as cross-linked polyethylenes, cross-linked high density polyethylene, cross-linked low density polyethylene, cross-linked copolymers of ethylene and vinyl acetate, cross-linked trans-polyoctylenes, and cross-linked polycyclooctenes. In some embodiments, the stimuli-responsive polymer may be a piezoelectric polymer, such as polyvinylidene fluoride (PVDF), polyvinylchloride (PVC), polyvinylfluoride (PVF), polyamide, a copolymer thereof, or a combination thereof. Further examples of stimuli-responsive polymer which responds to a mechanical stimulus include dielectric elastomers, inorganic-organic hybrid polymers, copolymer blends with polyethylene and styrene-butadiene copolymers, urethane-butadiene co-polymers, polymethyl methacrylate, polycaprolactone, and oligocaprolactone copolymers, block copolymer of polyethylene terephthalate (PET) and polyethyleneoxide (PEO), block copolymer containing polystyrene and poly(1,4-butadiene), and an ABA triblock copolymer made from poly(2-methyl-2-oxazoline) and polytetrahydrofuran, to name only a few.

A stimuli-responsive polymer which responds to an electrical stimulus may be one that is responsive to an electrical property, such as current, voltage, electrical charge, polarity, and/or electric field. One or more electrical properties may be varied to modulate the electrical stimulus on the stimuli responsive polymer.

The stimuli-responsive polymer which responds to an electrical stimulus may otherwise be termed as an electro-responsive polymer and may, for example, be an electroactive polymer or a conductive polymer. An electroactive polymer is characterized in that it is able to convert electrical energy into mechanical motion through a process of deformation. For example, it may undergo a change in size or shape when stimulated by an electric field or reversibly generate energy when motioned. Examples of electroactive polymers include, but are not limited to, polyvinylidene fluoride (PVDF), or electroactive liquid-crystal elastomers, electrostrictive cellulose, or an ionic electroactive polymer such as an ionomeric polymer metal composite (IPMC). Further examples include polypyrrole, polyaniline, polythiophenes, polyethylenedioxythiophene, poly(p-phenylene vinylene), polysulfone, perfluorsulfonate, perfluorcarbonate, polyacetylene, a copolymer thereof, and a combination thereof. In various embodiments, the electroresponsive polymer may be a thermoplastic polymer, such as one or more selected from polycaprolactone, polylactic acid, polycarbonate, a copolymer thereof, or a combination thereof, and which may include an electrically conductive agent, such as metal particles, carbon nanotubes, graphite powder, and/or carbon particles.

The term "chemical stimulus" as used herein may refer to use of a solvent, a chemical, change in oxidative environment, humidity, ion concentration and/or pH variation on the stimuli-responsive polymer. The chemical stimulus may, for example, be derived from a wearer in the form of sweat or tears, or from the environment in the form of rain, smoke, or fog. One or more chemical properties may be varied to modulate the chemical stimulus on the stimuli responsive polymer. Examples of a stimuli-responsive polymer which responds to a chemical stimulus may be a water/solvent active polymer, an electrolyte, or a combination of an ionic substance and strong ionic polymer, such as a combination of cross-linked polymers of polyvinyl sulfonic acid or their derivatives with a cationic surfactant.

In some embodiments, a stimuli-responsive polymer which responds to a chemical stimulus may be a pH-responsive polymer. In various embodiments, it may be an electrolyte-based polymer or a polymer having a basic group, such as cross-linked polyacrylic acid or its derivative or metal salt, polyacrylamide derivative, cross-linked poly-alkyl sulfonic acid or its derivative or metal salt, cross-linked carboxy alkyl cellulose metal salt, or the like.

Polysaccharides, such as carrageenan, that change their conformation, for example, from a random to an ordered conformation, as a function of exposure to specific ions, such as $K^+$ or $Ca^{2+}$, may also be used as the stimulus-responsive polymer. In another example, a solution of sodium alginate may be gelled by exposure to $Ca^{2+}$. Other ion-sensitive polymers include polymers with pendant ion chelating groups, such as EDTA or histidine.

The term "hygrometry stimulus" as used herein refers to a specific form of chemical stimulus, where a change in humidity is applied on the stimuli-responsive polymer. An example of a stimuli-responsive polymer which responds to a hygrometry stimulus may be cellulose acetate. Other examples include a polymer composite of rigid polypyrrole (PPy) embedded with a flexible polyol-borate network, whereby PPy may absorb water and change its shape, while the soft polyol-borate network may also sensitive to water, so as to undergo hydrolysis and reformation of the borate ester crosslinker upon water absorption and desorption, respectively. Further examples may include poly diallyldimethylammonium chloride (pDADMAC), polyallylamine hydrochloride, polyethylene amine, a copolymer thereof, or a combination thereof. Some hydrogels, for example, may function as shape memory polymer, and may change shape while absorbing the humidity from the sweat released during the sport activity.

The term "electromagnetic wave stimulus" as used herein refers to use of radiation having a wavelength in the range of 10 μm to $10^6$ m on the stimuli-responsive polymer. The term "light stimulus", on the other hand, refers specifically to use of visible light on the stimuli-responsive polymer. A stimuli-responsive polymer which responds to an electromagnetic wave stimulus may otherwise be termed as a photoresponsive polymer, and a stimuli-responsive polymer which responds to light may alternatively be termed as a light-responsive polymer. Properties of the electromagnetic wave stimulus that may be varied include, but are not limited to, wavelength, intensity, dosage, and duration of irradiation. One or more electromagnetic wave properties may be varied to modulate the electromagnetic wave stimulus on the stimuli responsive polymer.

The stimuli-responsive polymer which responds to an electromagnetic wave stimulus may be functional polymers that undergo light-induced shape memory effects. They may contain chromophoric groups pendant to or along the main chain of the polymer, or be a polymer containing a compound such as diazo compound capable of performing cis-trans transition upon exposure to an electromagnetic wave of an appropriate wavelength. Photoresponsive polymer compounds may be dye molecules that isomerize or become ionized when they absorb certain wavelengths of electromagnetic radiation, converting them from hydrophobic to hydrophilic conformations, or they may be other dye molecules which give off heat when they absorb certain wavelengths of electromagnetic radiation. In the former, isomerization alone may cause chain expansion or collapse, while in the latter, the polymer may precipitate only if it is also temperature-sensitive.

Some electromagnetic radiation sensitive compounds may be converted by electromagnetic wave stimulation from a relatively non-polar hydrophobic, non-ionized state to a hydrophilic, ionic state, and vice versa. It may also be a polymer of carboxymethylcellulose which is capable of gelating with radioactive ray, or a polymer of photoresponsive group-introduced carboxymethylcellulose which is capable of gelating with ultraviolet radiation.

Various photoresponsive polymers may include polymers having pendant or backbone azobenzene groups. Photoresponsive dyes, such as aromatic azo compounds or stilbene derivatives, may be conjugated to a reactive monomer (an exception is a dye such as chlorophyllin, which already has a vinyl group), which may then be homopolymerized or copolymerized with other monomers, or copolymerized with temperature-sensitive or pH-sensitive monomers using the chain transfer polymerization, or be conjugated to one end of a stimuli-responsive polymer that reacts to a different (e.g., chemical) stimulus.

A stimuli-responsive polymer which responds to a biological stimulus may be one that is responsive to a biological property such as, but not limited to, glucose levels, oxygen levels, osmolality, levels of hormones, levels of nutrients, and/or levels of toxins. One or more biological properties may be varied to modulate the biological stimulus on the stimuli responsive polymer. Such stimuli-responsive polymers may, for example, be a polymethylacrylate polymer or a polyacrylate polymer such as poly(acrylic acid), poly (methacrylic acid), poly(propionic acid), poly(2-(dimethylamino)ethyl methacrylate), or poly(oligoethylene glycol methacrylates). Further examples may include comprises a polyacrylamide polymer including poly(N-isopropylacrylamide) or poly(N-ethylacrylamide), and/or a polyvinyl polymer including poly(vinyl methyl ether).

A stimuli-responsive polymer which responds to a magnetic stimulus may otherwise be termed as a magnetic responsive polymer. Properties of the magnetic stimulus that may be varied include, but are not limited to, polarity, magnetic strength, and duration of exposure to the magnetic force. One or more magnetic properties may be varied to modulate the magnetic stimulus on the stimuli responsive polymer.

The magnetic responsive polymer may, for example, be a polymer of tetracyanoethylene (TCNE) combined with manganese (Mn) ions, or a combination of emeraldine-based polyaniline (PANi) and tetracyanoquinodimethane (TCNQ). In some embodiments, a polymer may be rendered magnetic responsive by incorporating magnetically responsive metal oxides.

The magnetically responsive metal oxide may be ferromagnetic. As used herein, the term "ferromagnetic" refers to a material which may be magnetized by applying an external magnetic field, and which is able to exhibit remnant magnetization upon removal of the external magnetic field. Examples of a ferromagnetic material include a ferromagnetic metal such as Fe, Co, Ni, FeAu, FePt, FePd, and/or CoPt, a ferromagnetic metal oxide such as $Fe_2O_3$, $Fe_3O_4$, CoO, NiO, $CoFe_2O_4$, and/or $MnFe_2O_4$, a heterogeneous structure comprising a ferromagnetic metal and/or a ferromagnetic metal oxide such as Au—$Fe_2O_3$, Ag—$Fe_3O_4$, quantum dot-$Fe_2O_3$ structure, or combinations of the aforementioned.

The term "acoustic stimulus" as used herein refers to use of sound that is subsonic, sonic and/or ultrasonic on the stimuli-responsive polymer. Accordingly, the acoustic stimulus is to be understood as not limited to sound waves that are audible to the human ear. The acoustic stimulus may contain any vibration pattern, such as sinusoidal, burst, shock wave, and/or pulse, and in any frequency range. Properties of the acoustic stimulus that may be varied include, but are not limited to, intensity, frequency, and duration of exposure to the sound. One or more acoustic properties may be varied to modulate the acoustic stimulus on the stimuli responsive polymer.

The stimuli-responsive polymer may be responsive to two or more of the above-mentioned stimulus of non-thermal origin. For example, the stimuli-responsive polymer may be responsive to an electrical stimulus and a chemical stimulus, or an electrical stimulus and an electromagnetic wave stimulus, or a chemical stimulus and an acoustic stimulus. Polyvinylidene fluoride (PVDF), for example, is a stimuli-responsive polymer that is responsive to more than one stimulus of non-thermal origin as it is able to function as a piezoelectric polymer and an electroresponsive polymer, thereby being responsive to both mechanical and electrical stimuli.

Based on the technical teaching provided herein, it is within the skills of the person skilled in the art to select suitable stimuli-responsive polymer for the various frame components depending on their intended use. Selection of the stimuli-responsive polymer for the various frame components may furthermore be made so that there is concerted action by the frame components in making adjustments to the eyewear frame so as to provide a synergistic effect. In various embodiments, the stimuli-responsive polymer is selected from the group consisting of polyvinylidene fluoride (PVDF), a poly(N-isopropyl acrylamide)-based polymer, poly(vinyl methyl ether), poly(N-substituted methacrylamide derivative), cellulose acetate, cross-linked polyethylene, polyethylene/nylon6 graft copolymer, trans-polyisoprene, cross-linked ethylene-vinyl acetate copolymer, styrene-based polymers, acrylate-based polymers, polynorbornene, cross-linked polycyclooctene, polycaprolactone, polylactic acid, polycarbonate, an epoxy-based polymer, a thio-ene-based polymer, segmented polyurethane, and segmented polyurethane ionomer, poly(3-hydroxyalkanoate), a copolymer composed of dodecanedioic acid or sebacic acid monomer and bile acid-based polyester, a crosslinked (meth)acrylate polymer containing a number of cinnamic acid, and cinnamylidene acetic acid terminated star-poly (ethylene glycol) interpenetrated into a crosslinked poly(n-butyl acrylate), poly(pdioxanone), polyhydroxyalkanoate, dielectric elastomers, electroactive liquid-crystal elastomers, electrostrictive cellulose, a copolymer thereof, and a combination thereof.

The stimuli-responsive polymer may be comprised in the frame component as a separate and/or discrete layer, or uniformly dispersed within a matrix material. The stimuli-responsive polymer comprised in the frame component may be 50 wt % or more of the weight of the component to achieve a marked change of a physical property before and after stimuli-response. For example, the stimuli-responsive polymer comprised in the frame component may be 60 wt % or more, 70 wt % or more, 80 wt % or more, or 90 wt % or more, or be in the range of about 50 wt % to about 95 wt %, such as about 50 wt % to about 90 wt %, about 50 wt % to about 80 wt %, about 50 wt % to about 70 wt %, about 50 wt % to about 60 wt %, about 60 wt % to about 95 wt %, about 70 wt % to about 95 wt %, about 60 wt % to about 80 wt %, or about 65 wt % to about 75 wt %. In some embodiments, the frame component is formed entirely of the stimuli-responsive polymer.

The frame component may have a physical property which is reversibly changeable in response to a stimulus of non-thermal origin applied to the stimuli-responsive polymer. For example, the physical property may be chosen to have a reversible impact on the wear parameters of the eyewear frame. In various embodiments, the physical property is selected from the group consisting of shape, surface texture, surface roughness, adhesion property, hardness, volume, malleability, curvature, stiffness, and a combination thereof.

Under a specific stimulus, the stimuli responsive material may change, for example, stiffness, hardness, roughness, and/or shape of the frame component. The physical property that may be changed may be classified into categories such as shape modification and grip modification.

With reversible shape modification, the idea is to bring either more degrees of freedom than what can be proposed with standard frame material and tools to adjust the frame (like heater for plastic frames), either a number of predefined positions that are customized to the wearer and the usage of his/her frame. Compared to existing products, the shape modification of the part(s) of the frame that is(are) adjustable is not limited to one activity or one type of shape modification and the part shape can be fixed to desired positions and then unfixed when needed.

Using electrical current as a stimulus, for example, electroactive polymers or conductive polymers, such as a thermoplastic polymer selected from one or more of polycaprolactone, polylactic acid, or a polycarbonate, and which may include an additive which is electrically and/or thermally conductive such as carbon particles, may be used as a stimuli-responsive polymer. The electroresponsive polymer may in embodiments be hard and rigid without stimuli. Under application of an electrical current, the electroresponsive polymer may increase in temperature so as to exceed glass transition temperature ($T_g$) of the polymer. At temperatures above glass transition temperature of the electroresponsive polymer, the polymer may soften and becomes malleable. Accordingly, the electroresponsive polymer may be reshaped, such as by physically working the polymer to a new shape or by placing the softened polymer in a mould having a predefined shape. Since the polymer is malleable, it may assume the new shape or the predefined shape of the mould, and which is retained by the polymer after polymer temperature is decreased to a temperature below glass transition temperature of the polymer, whereby the polymer hardens. This operation may be repeated as often as needed, since the physical property of the stimuli responsive polymer is reversibly changeable.

Figure 2:
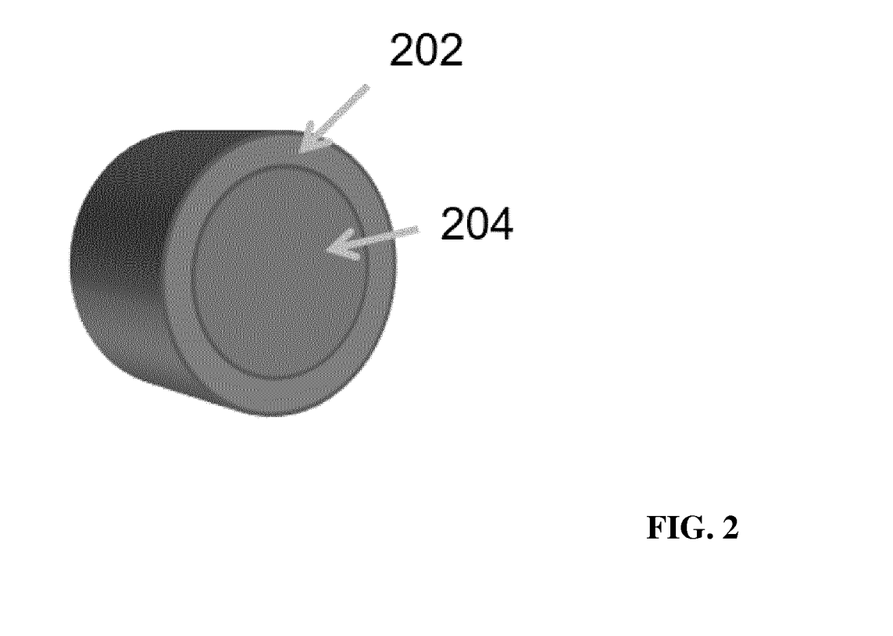
FIG. 2 is a schematic diagram of a frame component or a portion thereof, having a stimuli responsive polymer as a core, surrounded by a layer of a shape memory material.

Other physical properties besides shape may be modified in a similar manner. For example, the mould may be in the form of a shape memory material or a polymer membrane having a predefined physical property disposed as a layer surrounding the frame component or the stimuli responsive polymer. Such an embodiment is shown in FIG. 2, where the stimuli responsive polymer 204 forms a core which is surrounded by a layer of a shape memory material 202. The shape memory material disposed as a layer surrounding the frame component or the stimuli responsive polymer may assume the form of an envelope, to allow the stimuli-responsive polymer to hold its shape after adjustment is made.

In various embodiments, the shape memory material is a shape memory polymer. Shape memory polymers may have the unique ability to be set in a pre-set shape, deformed to an altered shape, and then revert back to the pre-set shape when exposed to the appropriate stimuli, such as changes in temperature, or application of a solvent, etc. For example, the shape memory polymer may be cast or otherwise shaped to have a pre-set shape or configuration. This shape memory polymer may be deformed to an altered or deformed shape and then be shifted back to the pre-set shape when appropriately cued. Examples of shape memory polymers have already been discussed above.

As mentioned above, the physical property may be surface texture, surface roughness, adhesion property, hardness, volume, malleability, curvature, and/or stiffness. Under application of an electrical current, the stimuli-responsive polymer may increase in temperature so as to exceed glass transition temperature of the polymer. At temperatures above glass transition temperature of the polymer, the polymer may soften and becomes malleable. By placing the malleable frame component or the stimuli responsive polymer in the shape memory material having a predefined physical property, the softened polymer may assume the predefined physical property of the mould. This predefined physical property may be retained by the polymer after polymer temperature is decreased to a temperature below glass transition temperature of the polymer. Advantageously, this allows modifications made by a wearer to the eyewear frame, for example, to be reset to an original position set by an eyecare practitioner and/or a predefined position adapted to an activity of the wearer.

The benefits of shape modification may be effected on several parts of the frame. For example, the stimuli-responsive material may be comprised in a frame temple, an earpiece, a nose pad, or the bridge of the frame.

Figure 3:
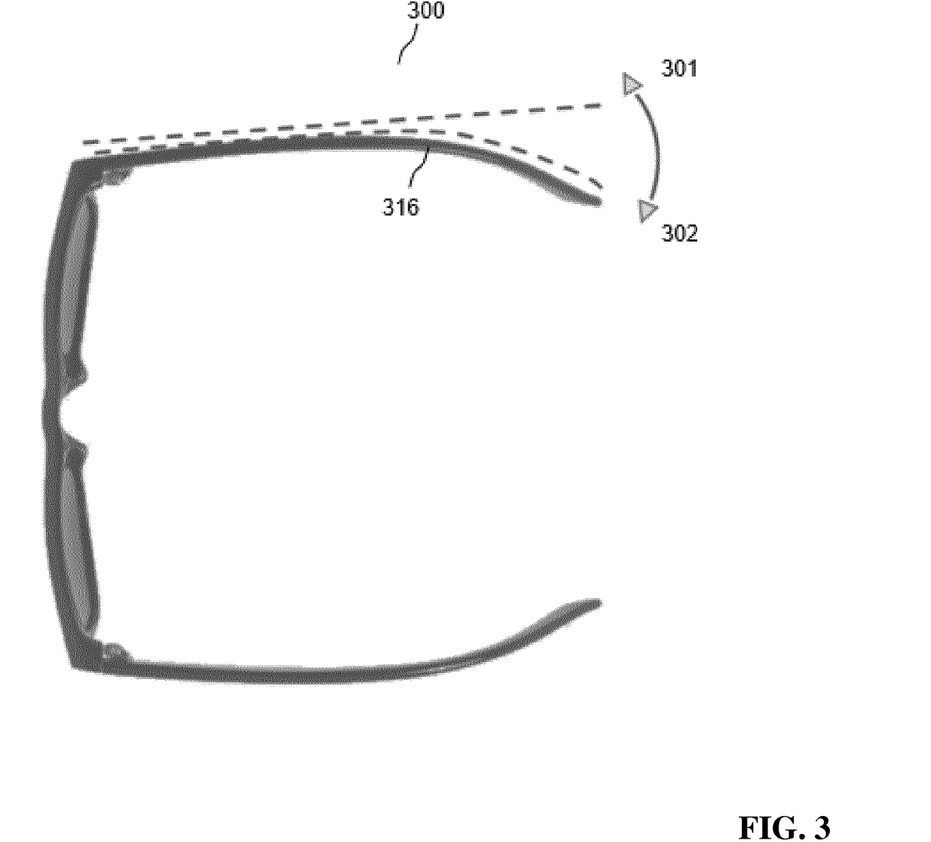
FIG. 3 is a schematic diagram of an eyewear frame, showing modification of wrap angle of the frame temple to tighten or loosen the frame.
Figure 4:
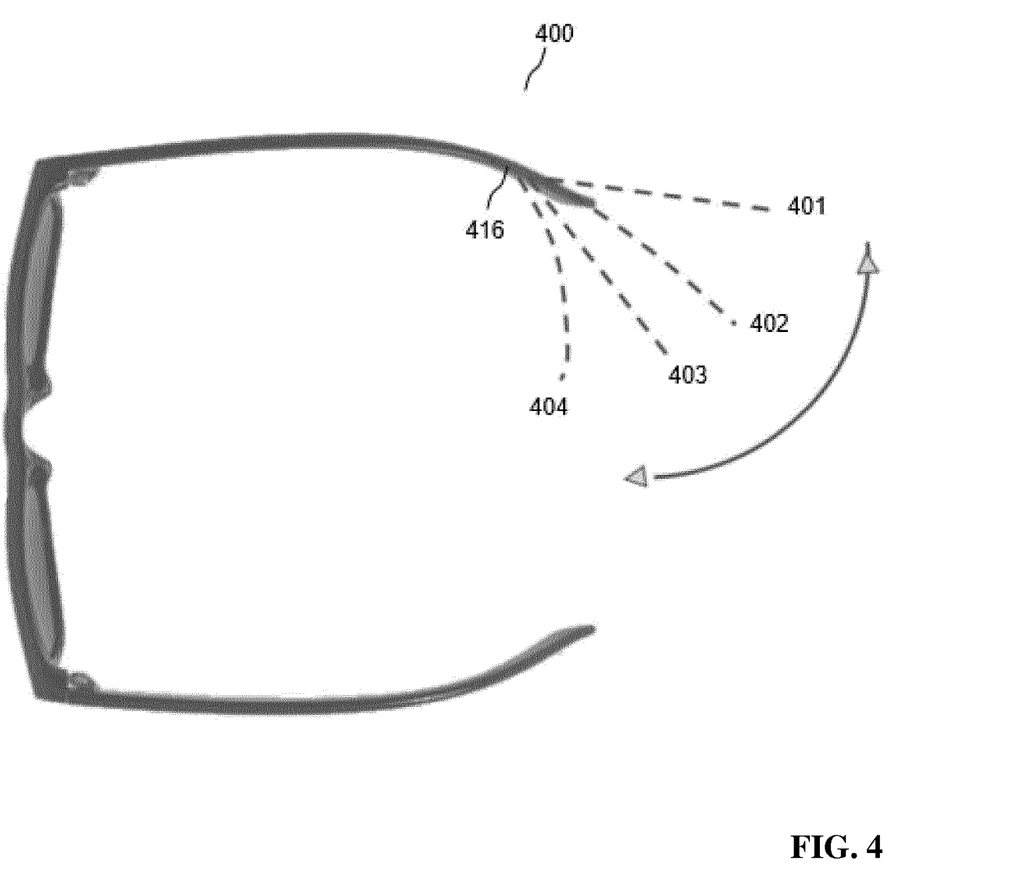
FIG. 4 is a schematic diagram of an eyewear frame, showing modification of shape of an ear piece to tighten or loosen the frame.

In various embodiments, the frame component is a frame temple or a portion thereof, and the physical property of the frame temple or a portion thereof includes at least one of shape, curvature, or malleability. The stimulus of non-thermal origin may be an electrical stimulus. The wrap angle of the frame temple may, for example, be modified to tighten or loosen the frame around the side of the head, such as that shown in FIG. 3. Referring to FIG. 3, an eyewear 300 is shown. The eyewear 300 comprises a frame temple 316. The frame temple 316 may assume position 301 as a normal position. Upon subjecting the stimuli-responsive polymer comprised in the frame temple 316 to a stimulus, such as light, the frame temple 316 may undergo a temple wrap modification to position 302. In some embodiments, shape of the earpieces may be modified to tighten or loosen the frame around the ears, such as that shown in FIG. 4. Referring to FIG. 4, an eyewear 400 is shown. The eyewear 400 comprises an earpiece 422. The earpiece 422 may assume position 402 as a normal position. Upon subjecting the stimuli-responsive polymer comprised in the earpiece 422 to a stimulus, such as electricity, the earpiece 422 may undergo an earpiece shape modification to position 403, 404, or 401.

In various embodiment, the frame temple or a portion thereof further comprises a rotatable element rotatable with respect to predefined axes. The rotatable element may be positioned in a center portion of the frame temple or a portion thereof, and may for example be covered or encapsulated by a stimuli-responsive polymer. The rotatable element may assist the softened polymer in adopting the new or predefined shape.

Figure 5:
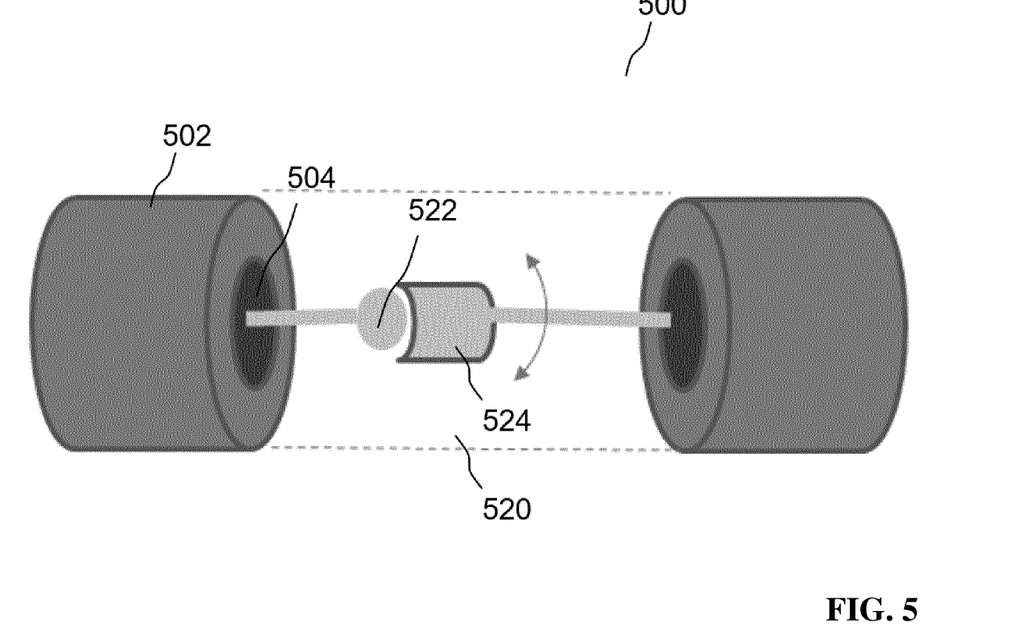
FIG. 5 is a schematic diagram of a rotatable element shown positioned within a portion of a frame temple.

For illustration purposes, FIG. 5 depicts a portion of a frame temple 500, wherein a rotatable element 520 is shown positioned within the portion of the frame temple 500. The portion of the frame temple 500 may comprise a core of a conductive polymer 504 and a shell of a shape memory polymer 502, which is also depicted in FIG. 2. The rotatable element 520 may comprise a ball 522 and a socket 524, to allow rotation of the rotatable element 520 with respect to predefined axes.

To avoid unwanted heat dissipation, at least a portion of the rotatable element may be formed of a non-electrically conductive or non-thermally conductive material, and may for example be manufactured by 3D printing.

Figure 6:
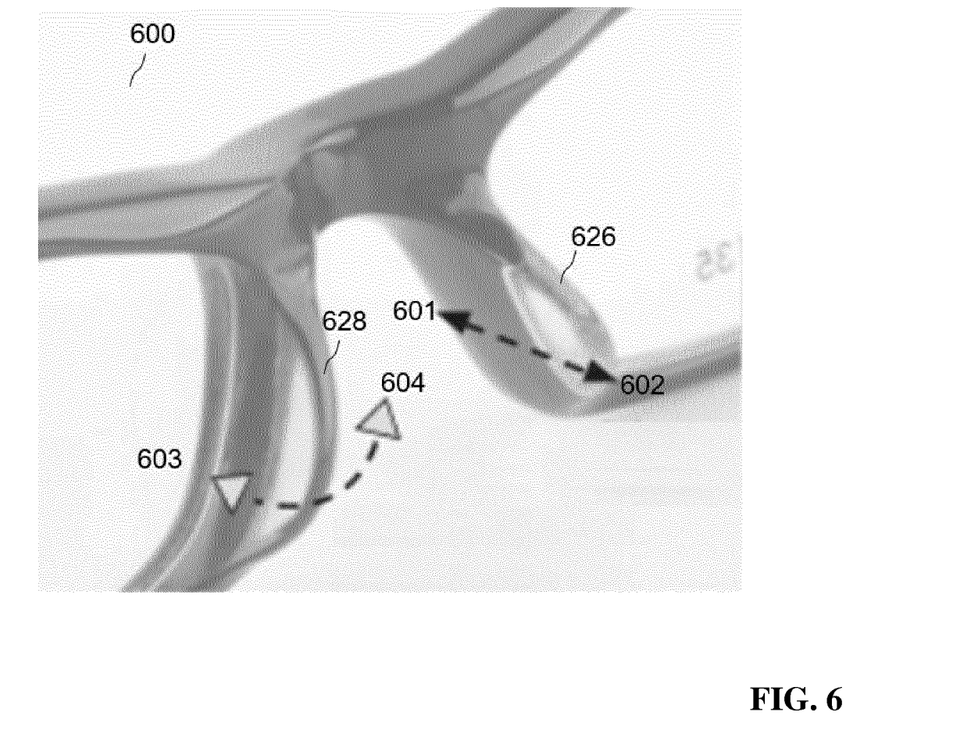
FIG. 6 is a schematic diagram of an eyewear frame, showing modification of wrap angle and shape of a nosepad to avoid slippage (tightening) or to loosen the frame around a nose.

In addition to, or apart from the above-mentioned, the frame component may in some embodiments be a nose pad. The wrap angle and the shape of the nosepad may be modified to avoid slippage (tightening) or to loosen the frame around a nose, such as that shown in FIG. 6. Referring to FIG. 6, a portion of eyewear 600 is depicted. The eyewear 600 comprises nosepads 626, 628. The nosepad 626 may undergo a nosepad shape modification along direction 601 to 602 upon application of a stimulus to the stimuli-responsive polymer comprised in the nosepad 626. The nosepad 628 may undergo a nosepad wrap modification from position 603 to position 604 upon application of a stimulus to the stimuli-responsive polymer comprised in the nosepad 628.

Figure 7:
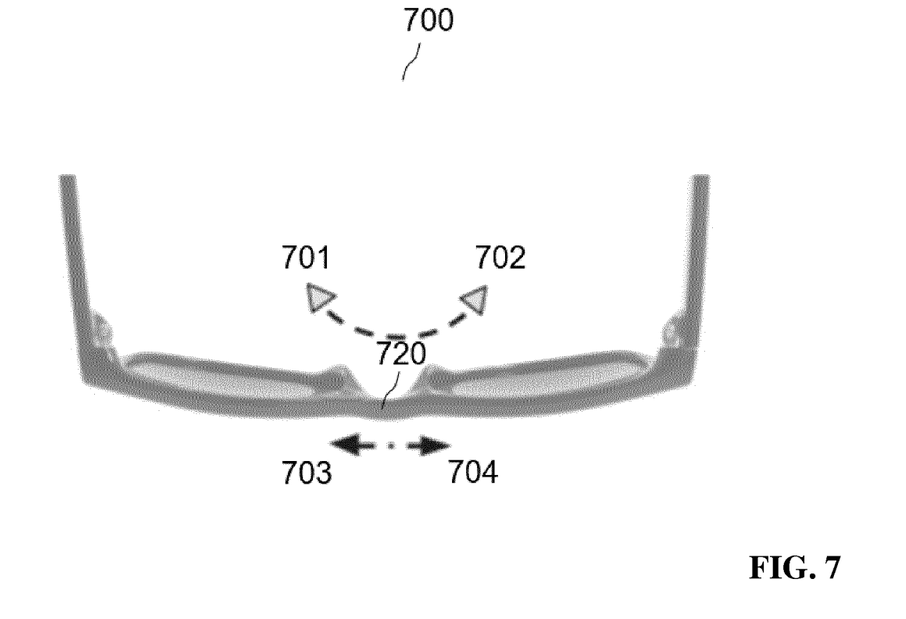
FIG. 7 is a schematic diagram of an eyewear frame, showing modification of shape of the bridge to wrap or unwrap the frame or to adjust the bridge function according to size of a nose.

In addition to, or apart from the above-mentioned, the frame component may in some embodiments be a bridge. There may be modification of the shape of the bridge to wrap or unwrap the frame or to adjust the bridge function according to size of a nose, such as that shown in FIG. 7. Referring to FIG. 7, a portion of an eyewear 700 is shown. The eyewear 700 comprises a bridge 720. The bridge 720 may undergo bridge shape modification upon application of a stimulus to the stimuli-responsive polymer comprised in the bridge 720, in a lateral direction 701 to 702 along the bridge 720, or in a transverse direction 703 to 704 to the bridge 720, In various embodiments, the stimulus of non-thermal origin may be electromagnetic radiation, and the frame component may be a frame temple or a portion thereof. A photoresponsive polymer such as optically transparent, pre-strained polystyrene may be incorporated as lines on a frame temple so that the frame temple may be folded to reduce the length of the frame temple, so as to adapt the eyewear to a wearer having a shorter eye to ear distance.

Figure 8:
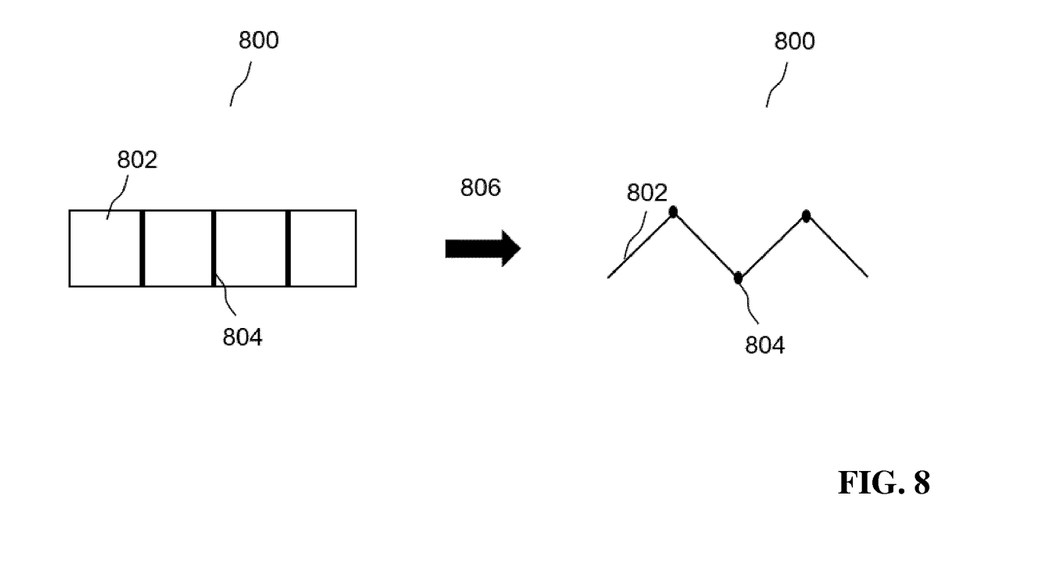
FIG. 8 is a schematic diagram showing a foldable frame temple based on the black markings on the polymer material when responded to light stimuli.

To illustrate this, FIG. 8 is a schematic diagram showing a frame temple 800. The frame temple 800 may be formed of a polymer sheet 802. A photoresponsive polymer 804 may be incorporated as black lines on the polymer sheet 802. Upon irradiation of the frame temple 800 with electromagnetic radiation or light 806, the photoresponsive polymer may shrink to cause the polymer sheet 802 to fold along the lines, to result in reduction in length of the frame temple 800. In various embodiments, the lines may assume other patterns such as waves or spirals, and the frame temple 800 may be formed of any suitable material other than a polymer sheet, such as a metal sheet.

In various embodiments, the photoresponsive polymer may be present on at least a portion of hinges of an eyewear, and be configured such that upon exposure to an electromagnetic radiation or light, the hinges may self-fold as a result of localized absorption of the electromagnetic radiation or light on the photoresponsive polymer. As a result, the frame temple, which is attached to the hinges, may be pulled in closer to the wearer's face so that the eyewear fits relatively closely to the wearer's face to protect his/her eyes.

The onset of folding and the time required to complete folding may depend, for example, on intensity of the electromagnetic radiation such as infra-red (IR) light, a width of the hinge, and temperature of the base support as a result of the electromagnetic radiation. The folding angle of the hinge may be controlled by varying exposure time to electromagnetic radiation or light, and the shape, size and pattern of the region on the hinge containing the photoresponsive polymer. Advantageously, flexibility of the folding angle allows the formation of different shapes.

Although the above examples are illustrated with respect to the frame component being a frame temple and/or a hinge, this may be extended to various parts of the frame, such as the earpiece, nose pad, and bridge. This may allow an eyecare practitioner or a wearer to adjust the eyewear frame according to each wearer's needs and activities. The eyewear frame may also be automatically adjusted since the photoresponsive polymer may change shape reversibly with stimuli of high light intensities outdoors, thus leading to self-folding of the frame to increase the grip on the wearer's face with outdoor light, and unfolding with less intense indoor light.

To retain the intended shape and structure of the frame, the photoresponsive polymer may be removed or erased after irradiation by electromagnetic radiation. Furthermore, shape of the eyewear frame may be reversibly changed numerous times through re-application of the photoresponsive polymer and stimuli.

As mentioned above, the frame component may be removably attached to the eyewear frame. In this regard, the frame component may in embodiments be a polymeric film comprising the stimuli-responsive polymer, which may be removably attached to the eyewear frame, so as to confer the portion of the eyewear that is being attached to the ability to change reversibly one of its physical properties under the action of a stimulus.

The polymeric film may, for example, be attached to the eyewear frame at one or more of four main points of adjustments to the frame, namely hinge, nose pad, pad arm, temple/temple tips. The polymeric film may be applied directly or in the form of clip-ons.

Figure 9:
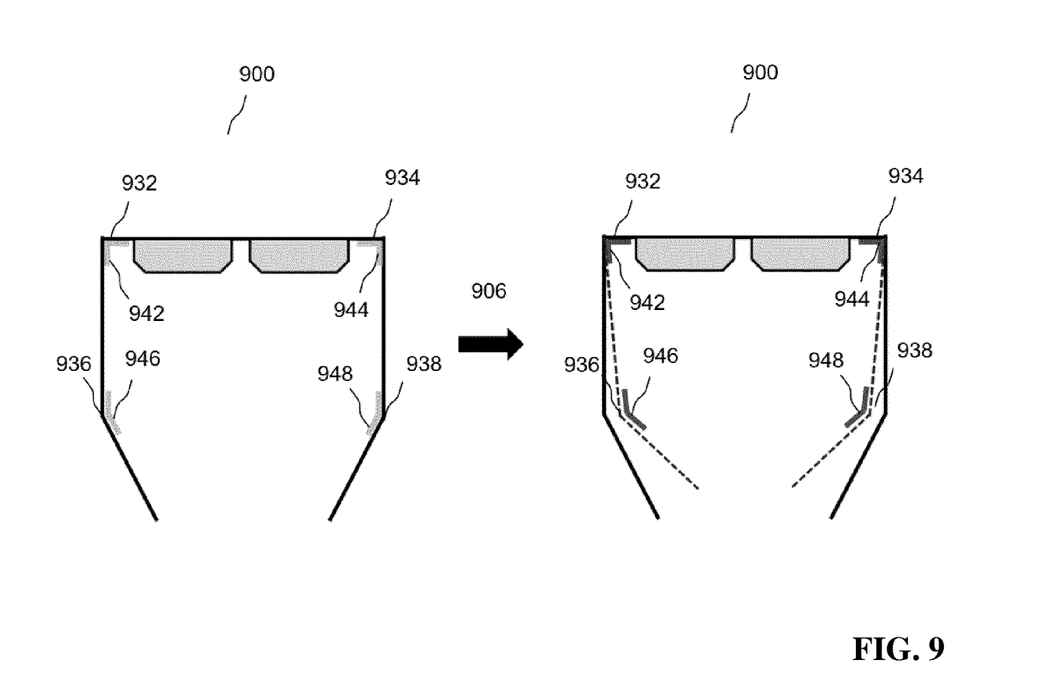
FIG. 9 is a schematic diagram showing attachment of polymeric films at the hinges and bends of frame temples of an eyewear.

FIG. 9 is a schematic diagram showing attachment of polymeric films 942, 944, 946, 948 at the hinges 932, 934 and bends of frame temples 936, 938 of an eyewear 900. As shown, when indoors (left), hinges 932, 934 and bends of frame temples 936, 938 are at original shape with less grip on a wearer's face. When outdoors (right) wherein the light intensity may be higher, upon subjecting to electromagnetic radiation 906, polymer films 942, 944, 946, 948 at the hinges 932, 934 and bends of frame temples 936, 938 are at a stimulated configuration, whereby the stimuli-responsive polymer in the polymer films 942, 944, 946, 948 may undergo photo-crosslinking such that there is light-induced self-folding at both the hinges and the bends of the frame, to increase grip of the eyewear on a wearer's face. This change in configuration of the eyewear is reversible, in that when the light intensity is lower such as an indoor condition, the stimuli-responsive polymer in the polymer films 942, 944, 946, 948 may undergo photo-decrosslinking. In so doing, the polymer films 942, 944, 946, 948 may return to their original configuration as shown in the left hand side of FIG. 9, to self-unfold and loosen the frame's grip on the wearer's face and ears.

In addition to or apart from the above, a photoresponsive polymer may be integrated directly into the shape memory polymer 202 as shown in FIG. 2.

As mentioned above, at least one frame component in the eyewear frame comprises a stimuli-responsive component. In some embodiments, two or more frame components, such as three, four, five, or more frame components in the eyewear frame comprises a stimuli-responsive component. The two or more frame components may function together in a concerted manner to provide for an eyewear that allows automatic adjustment of the eyewear frame to be carried out during a certain activity. In other words, there may be a synergistic effect on self-adjustment of frame if two or more of the frame components are subjected to a stimulus of non-thermal origin, which may be the same or different on each frame component.

For example, the frame may comprise a electroresponsive polymer and a photoresponsive polymer Accordingly, use of electrical stimulus to reduce hardness of the frame comprising the electroresponsive polymer may be combined with use of an electromagnetic wave stimulus to adjust shape of a frame comprising the photoresponsive polymer so as to allow self-adjustment of the frame to be carried out faster and in a more efficient manner.

In addition to or apart from the above-mentioned embodiments relating to a reversible change in shape of the eyewear frame, modification may be made to the grip to change the roughness and/or the adhesion property of the frame component or a portion thereof so that that the frame or some frame parts have a grip on the skin that is adapted to an activity.

Figure 10A:
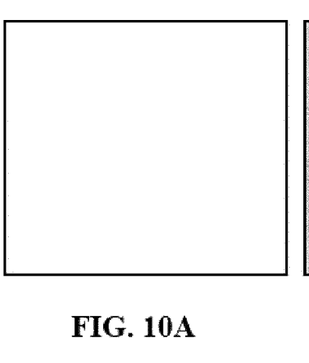
FIG. 10A to FIG. 10C are schematic diagrams depicting roughness change of a material, arranged in order from smoothest (FIG. 10A) to roughest (FIG. 10C).
Figure 10B:
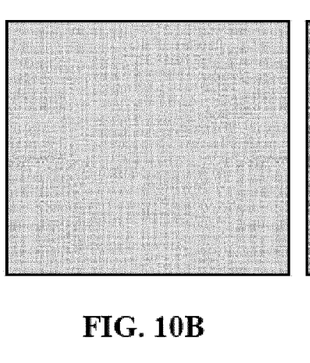
Figure 10C:
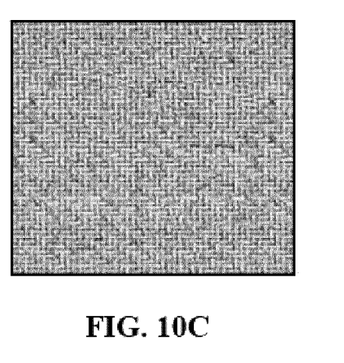

For illustration purposes only, FIG. 10A to FIG. 10C depicts roughness change of a material, arranged in order from smoothest (FIG. 10A) to roughest (FIG. 10C). The roughness variation may be obtained, for example, with a material that can change its micro scale shape under the action of a stimulus or by adding micromechanics components to the material.

In addition to or apart from the above-mentioned, the frame component may in some embodiments include at least one of a frame temple, a nose pad, a portion thereof, or a combination thereof. The physical property of the at least one of a frame temple, a nose pad, a portion thereof, or a combination thereof may include surface roughness. For example, the nose pad or the surface of the frame temple or spectacle arms in contact with the skin or the earpiece, may change in stiffness or roughness or adhesive properties. The stiffness or roughness or adhesive properties may be reversibly changeable in order to have a better grip on the skin when the wearer is in an elevated active state such as during sports activities, and a lesser grip on the skin or more slippery when the wearer is or wants to be in a more relaxed state. The stimulus of non-thermal origin may be a chemical stimulus, specifically a hygrometric stimulus, due to humidity (sweat) coming from the wearer as a result of participation in a sports activity.

Apart from functional purposes, increase in surface roughness of the frame or frame components may be made for cosmetic purposes, for example, to provide the frame or a portion thereof with a matt surface.

A reversible adhesive mechanism may also be exploited to allow the frame or some frame parts have a grip on the skin that is adapted to an activity. Examples may include Gecko-like adhesive mechanism that can be activated through a higher localized pressure of the adhesive part on the skin to activate the adhesive functionality during a specific activity. The adhesion property variation may alternatively or additionally be obtained, for example, by suction pads activation.

In various embodiments, the physical property which is reversibly changeable in response to a stimulus of non-thermal origin applied to the stimuli-responsive polymer is configured to adapt the eyewear frame to the morphology of the wearer.

Various embodiments disclosed herein may, for example, be used either by the eyecare practitioner to have an easier way to adjust the frame according to the wearer's morphology, or by the wearer himself to adjust the frame for more comfort or to adapt it to the activity he would like to do. Furthermore, embodiments disclosed herein allow self-adjustment of the frame according to external stimuli to suit an individual's activity and local environment.

Various embodiments refer in a further aspect to an eyewear comprising an eyewear frame according to the first aspect and an optical lens. As mentioned above, the eyewear disclosed herein refers generally to items and accessories worn on or over the eyes, which may be for purposes of improving or enhancing visual acuity, for protecting against the environment, for fashion, or for adornment, such as eyeglasses, goggles, or other objects on or worn over the eyes, or head-mounted devices. The optical lens may be any suitable optical lens, such as, but not limited to, prescription, non-prescription, reflective, anti-reflective, magnifying, polarizing, colored, tinted, clear, anti-fogging, and/or ultraviolet (UV) light protected lens.

The eyewear may be a smart eyewear, and/or be available off the shelf, meaning that it may be purchased without requiring prescription by an eyecare practitioner such as in the case of sunglasses, plano sunwear, readers, etc. In some embodiments, the eyewear may be manufactured using additive manufacturing as a possible manner of manufacturing.

Various embodiments refer in a further aspect to a method of adjusting an eyewear frame. The method comprises providing an eyewear frame according to the first aspect, disposing the frame component comprising the stimuli-responsive polymer in a mould having a predefined physical property, and applying a stimulus of non-thermal origin to the stimuli-responsive polymer until the physical property of the frame component is adapted to the predefined physical property of the mould.

As mentioned above, the frame component comprising the stimuli-responsive polymer may become malleable by subjecting the stimuli-responsive polymer to a stimulus of non-thermal origin, such as an electrical current, which may increase temperature of the stimuli-responsive polymer to a temperature which exceeds glass transition temperature of the polymer.

Accordingly, by disposing the frame component comprising the stimuli-responsive polymer in a mould having a predefined physical property, and applying a stimulus to the stimuli-responsive polymer, the polymer may increase in temperature to a temperature which exceeds glass transition temperature of the polymer. The polymer may softened and assume the predefined physical property of the mould. Examples of physical property have already been mentioned above. This predefined physical property may be retained by the polymer after polymer temperature is decreased to a temperature below glass transition temperature of the polymer. Advantageously, this allows modifications made by a wearer to the eyewear frame, for example, to be reset to an original position set by an eyecare practitioner and/or a predefined position adapted to an activity of the wearer.

The invention has been described broadly and generically herein. Each of the narrower species and subgeneric groupings falling within the generic disclosure also form part of the invention. This includes the generic description of the invention with a proviso or negative limitation removing any subject matter from the genus, regardless of whether or not the excised material is specifically recited herein.

Other embodiments are within the following claims and non-limiting examples. In addition, where features or aspects of the invention are described in terms of Markush groups, those skilled in the art will recognize that the invention is also thereby described in terms of any individual member or subgroup of members of the Markush group.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. An eyewear frame having at least one frame component comprising a stimuli-responsive polymer, wherein the frame component has a physical property which is reversibly changeable in response to a stimulus of non-thermal origin applied to the stimuli-responsive polymer, wherein a first said frame component is a frame temple or a portion thereof that further comprises a rotatable element rotatable with respect to predefined axes that is covered or encapsulated by the stimuli-responsive polymer so as to assist said stimuli-responsive polymer in adopting a new or predefined shape.

2. The eyewear frame according to claim 1, wherein the frame component is removably attached to the eyewear frame.

3. The eyewear frame according to claim 2, wherein at least another said frame component is selected from the group consisting of an ear piece, a nose pad, a pad arm, a bridge, a top bar, a rim, an eye-wire, an end piece, a front part, a hinge, a screw, a polymeric film comprising the stimuli-responsive polymer, a portion thereof, and a combination thereof.

4. The eyewear frame according to claim 2, wherein the stimuli-responsive polymer is selected from the group consisting of polyvinylidene fluoride (PVDF), a poly(N-isopropyl acrylamide)-based polymer, poly(vinyl methyl ether), poly(N-substituted methacrylamide derivative), cellulose acetate, cross-linked polyethylene, polyethylene/nylon6 graft copolymer, trans-polyisoprene, cross-linked ethylene-vinyl acetate copolymer, styrene-based polymers, acrylate-based polymers, polynorbornene, cross-linked polycyclooctene, an epoxy-based polymer, a thio-ene-based polymer, segmented polyurethane, and segmented polyurethane ionomer, poly(3-hydroxyalkanoate), a copolymer composed of dodecanedioic acid or sebacic acid monomer and bile acid-based polyester, a crosslinked (meth)acrylate polymer containing a number of cinnamic acid, and cinnamylidene acetic acid terminated star-poly (ethylene glycol) interpenetrated into a crosslinked poly(n-butyl acrylate), poly(pdioxanone), polyhydroxyalkanoate, dielectric elastomers, electroactive liquid-crystal elastomers, electrostrictive cellulose, a copolymer thereof, and a combination thereof.

5. The eyewear frame according to claim 2, wherein the physical property is selected from the group consisting of shape, surface texture, surface roughness, adhesion property, hardness, volume, malleability, curvature, stiffness, and a combination thereof.

6. The eyewear frame according to claim 1, wherein at least another said frame component is selected from the group consisting of an ear piece, a nose pad, a pad arm, a bridge, a top bar, a rim, an eye-wire, an end piece, a front part, a hinge, a screw, a polymeric film comprising the stimuli-responsive polymer, a portion thereof, and a combination thereof.

7. The eyewear frame according to claim 6, wherein the stimuli-responsive polymer is selected from the group consisting of polyvinylidene fluoride (PVDF), a poly(N-isopropyl acrylamide)-based polymer, poly(vinyl methyl ether), poly(N-substituted methacrylamide derivative), cellulose acetate, cross-linked polyethylene, polyethylene/nylon6 graft copolymer, trans-polyisoprene, cross-linked ethylene-vinyl acetate copolymer, styrene-based polymers, acrylate-based polymers, polynorbornene, cross-linked polycyclooctene, an epoxy-based polymer, a thio-ene-based polymer, segmented polyurethane, and segmented polyurethane ionomer, poly(3-hydroxyalkanoate), a copolymer composed of dodecanedioic acid or sebacic acid monomer and bile acid-based polyester, a crosslinked (meth)acrylate polymer containing a number of cinnamic acid, and cinnamylidene acetic acid terminated star-poly (ethylene glycol) interpenetrated into a crosslinked poly(n-butyl acrylate), poly(pdioxanone), polyhydroxyalkanoate, dielectric elastomers, electroactive liquid-crystal elastomers, electrostrictive cellulose, a copolymer thereof, and a combination thereof.

8. The eyewear frame according to claim 6, wherein the physical property is selected from the group consisting of shape, surface texture, surface roughness, adhesion property, hardness, volume, malleability, curvature, stiffness, and a combination thereof.

9. The eyewear frame according to claim 1, wherein the stimuli-responsive polymer is selected from the group consisting of polyvinylidene fluoride (PVDF), a poly(N-isopropyl acrylamide)-based polymer, poly(vinyl methyl ether), poly(N-substituted methacrylamide derivative), cellulose acetate, cross-linked polyethylene, polyethylene/nylon6 graft copolymer, trans-polyisoprene, cross-linked ethylene-vinyl acetate copolymer, styrene-based polymers, acrylate-based polymers, polynorbornene, cross-linked polycyclooctene, an epoxy-based polymer, a thio-ene-based polymer, segmented polyurethane, and segmented polyurethane ionomer, poly(3-hydroxyalkanoate), a copolymer composed of dodecanedioic acid or sebacic acid monomer and bile acid-based polyester, a crosslinked (meth)acrylate polymer containing a number of cinnamic acid, and cinnamylidene acetic acid terminated star-poly (ethylene glycol) interpenetrated into a crosslinked poly(n-butyl acrylate), poly(pdioxanone), polyhydroxyalkanoate, dielectric elastomers, electroactive liquid-crystal elastomers, electrostrictive cellulose, a copolymer thereof, and a combination thereof.

10. The eyewear frame according to claim 1, wherein the physical property is selected from the group consisting of shape, surface texture, surface roughness, adhesion property, hardness, volume, malleability, curvature, stiffness, and a combination thereof.

11. The eyewear frame according to claim 1, wherein the stimulus of non-thermal origin is selected from the group consisting of a mechanical stimulus, an electrical stimulus, an electromagnetic wave stimulus, a light stimulus, a hygrometry stimulus, a chemical stimulus, a biological stimulus, a magnetic stimulus, an acoustic stimulus, and a combination thereof.

12. The eyewear frame according to claim 1, wherein the eyewear frame further comprises a shape memory material having a predefined physical property disposed as a layer surrounding the stimuli responsive polymer.

13. The eyewear frame according to claim 1, wherein the physical property of the frame temple or a portion thereof includes at least one of shape, curvature, malleability, or a combination thereof.

14. The eyewear frame according to claim 13, wherein the stimulus of non-thermal origin is an electrical stimulus.

15. The eyewear frame according to claim 1, wherein at least a portion of the rotatable element is formed of a material that is at least one of electrically non-conductive, thermally non-conductive, or a combination thereof.

16. The eyewear frame according to claim 1, wherein the physical property includes surface roughness.

17. The eyewear frame according to claim 1, wherein the physical property which is reversibly changeable in response to a stimulus of non-thermal origin applied to the stimuli-responsive polymer is configured to adapt the eyewear frame to the morphology of the wearer.

18. An eyewear comprising an eyewear frame according to claim 1 and an optical lens.

19. A method of adjusting an eyewear frame, the method comprising:
  a) providing an eyewear frame according to claim 1,
  b) disposing the frame component comprising the stimuli-responsive polymer in a mould having a predefined physical property, and
  c) applying a stimulus of non-thermal origin to the stimuli-responsive polymer until the physical property of the frame component is adapted to the predefined physical property of the mould.

* * * * *